Oct. 8, 1935.    W. Y. BROWN    2,016,888
LUBRICATION APPARATUS
Filed July 25, 1934    4 Sheets-Sheet 3
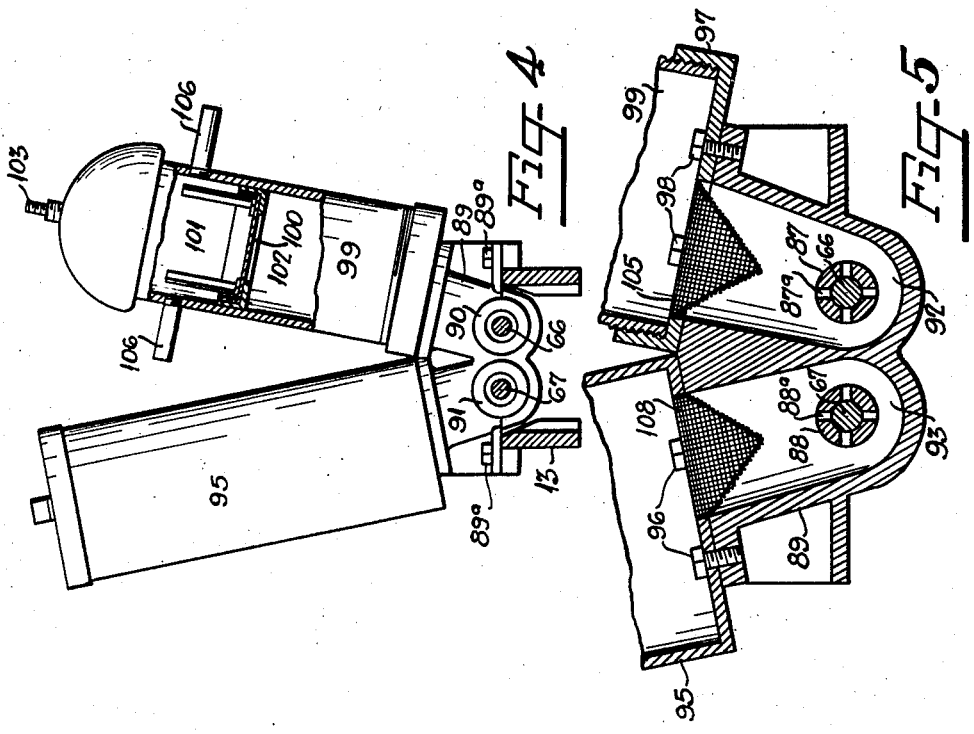
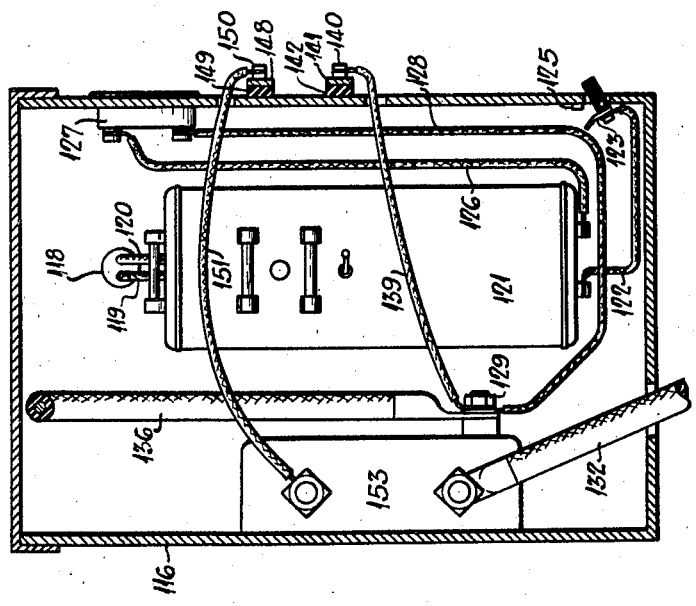
WILLIAM Y. BROWN
Inventor
By James S. Eaton
Attorney Oct. 8, 1935.   W. Y. BROWN   2,016,888
LUBRICATION APPARATUS
Filed July 25, 1934   4 Sheets-Sheet 4

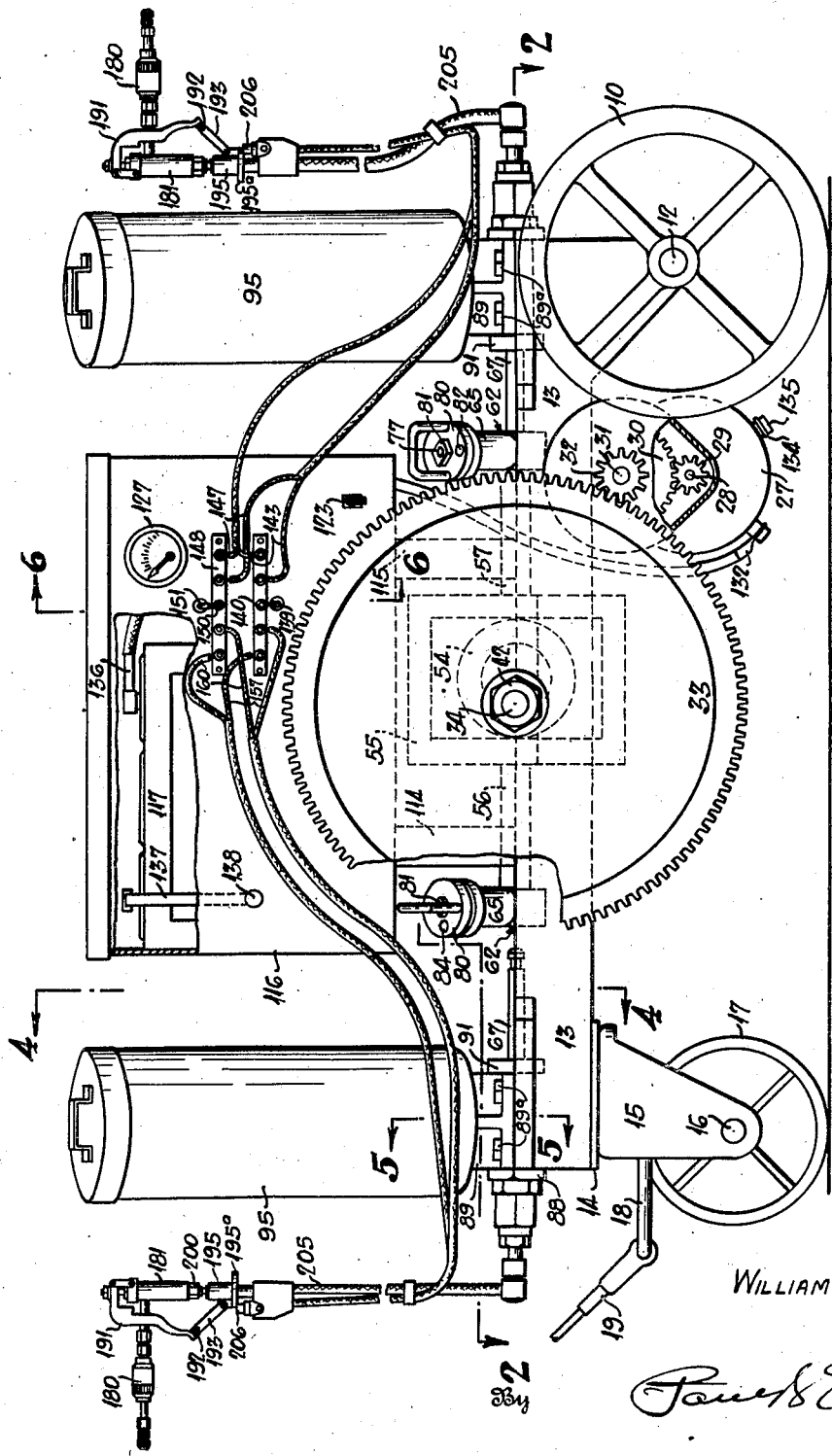

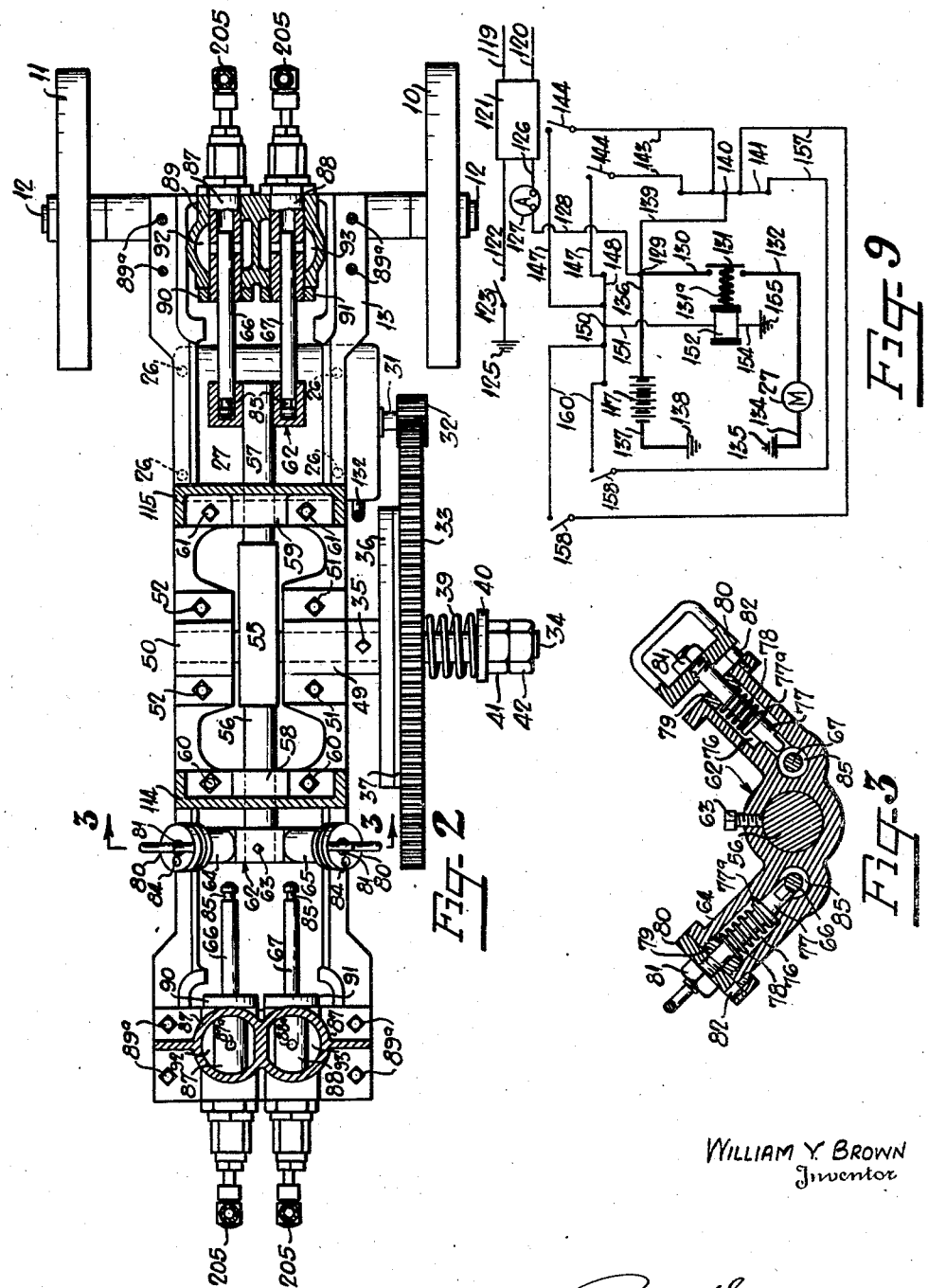

WILLIAM Y. BROWN
Inventor

By
Attorney

Patented Oct. 8, 1935

2,016,888

UNITED STATES PATENT OFFICE 2,016,888

LUBRICATION APPARATUS

William Y. Brown, Charlotte, N. C., assignor of part interests to William C. Honeycutt, Black Mountain, N. C., and Robert H. Garland, Charlotte, N. C.

Application July 25, 1934, Serial No. 736,913

8 Claims. (Cl. 221—47.1)

This invention relates to an improvement in lubricating apparatus, such as grease guns, and more especially to a portable grease gun having the source of power such as a storage battery mounted on a portable frame work for driving an electric motor which in turn drives one or more grease guns disposed on the framework together with means for optionally and mechanically connecting one or more grease guns at a time to the driving means, together with means on the end of the discharge hose of the grease gun for allowing the grease to flow from the end of the hose into a suitable fitting to be lubricated and at the same time completing a circuit for driving the electric motor for operation of the grease gun.

It is an object of this invention to provide a portable grease gun having a self-contained electric motor and charging apparatus for driving the grease gun with a discharge hose connected to the grease gun and a nipple on the end of the hose for connection to the bearings to be lubricated together with means in the end of the hose for opening a valve in the end of the hose and also completing an electric circuit to the motor for driving the grease gun.

It is another object of this invention to provide a discharge outlet on a hose associated with a grease gun driven by an electric motor wherein means are provided for opening the outlet to admit grease to a bearing to which the outlet is connected and so that by additional opening of the outlet an electric circuit can be closed for driving the electric motor.

It is a further object of this invention to provide a grease gun having a discharge outlet with a valve therein and manual means for opening the valve and an electric switch controlling a circuit to a motor for driving the grease gun which is adapted to be closed after the valve has been moved to a predetermined position and until the valve is moved to a predetermined position, the circuit will not be closed, thus permitting the grease under pressure in the hose to flow into the bearings without the necessity of starting the motor for each bearing to be lubricated.

Some of the objects of my invention having been stated, other objects will appear as the description proceeds when taken in connection with the accompanying drawings, in which:—

Figure 1 is a side elevation of my invention;

Figure 2 is a sectional plan view taken along the line 2—2 in Figure 1;

Figure 3 is a sectional view taken along the line 3—3 in Figure 2 showing one of the mechanical latches in connected position and the other in disconnected position;

Figure 4 is a transverse sectional view taken along the line 4—4 in Figure 1;

Figure 5 is a transverse sectional view taken along the line 5—5 in Figure 1;

Figure 6 is a sectional view taken along the line 6—6 in Figure 1;

Fig. 9 is a schematic wiring diagram showing the manner in which my apparatus is wired.

Figure 7:
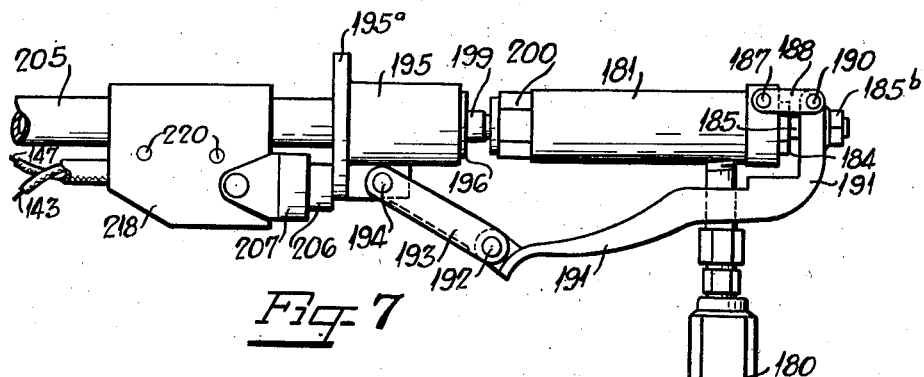
Figure 7 is an elevation of my improved nozzle which is used on this apparatus.

Referring more particularly to the drawings, the numerals 10 and 11 denote suitable rear wheels for my apparatus which are rotatably mounted on rear axle 12, said axle 12 being secured to the lower portion of frame 13. The lower portion of the front end of frame 13 has secured thereto a plate 14 to which is rotatably secured a bracket 15 which has mounted in the lower end thereof, as at 16, a wheel 17. There is only one wheel 17 which supports the front end of my apparatus and it is evident that since bracket 15 is rotatably mounted in plate 14 that it may be turned in any desired direction to guide the apparatus to the desired point. Secured to the bracket 15 is an outstanding member 18 which has mounted on the end thereof a tongue 19.

Secured to the lower side of frame 13 by any suitable means such as stud bolts 26 is an electric motor 27. This motor has a main drive shaft 28 upon which is fixedly mounted a pinion 29. Pinion 29 is adapted to mesh with a larger pinion 30 mounted on shaft 31. On the end of shaft 31 is another pinion 32 which meshes with the large gear 33 loosely mounted on the main drive shaft 34 of the lubrication apparatus. Fixedly secured to main drive shaft 34, by any suitable means such as set screw 35, is a hub 36, and disposed between this hub 36 and wheel 33 is a friction disk 37 which is usually composed of rubber or fabric which causes the hub 36 to frictionally engage the gear wheel 33. The gear wheel 33 is held tightly against the friction disk 37 by means of compression spring 39 which encircles the main drive shaft 34, and a suitable washer 40 compresses spring 39 against gear 33, said washer being confined on the shaft 34 by any suitable means such as nuts 41 and 42.

It is evident that the friction between the large gear wheel 33 and the friction disk 37 may be varied by tightening or loosening the nuts 41 and 42.

Main drive shaft 34 is rotatably mounted in bearings 49 and 50, said bearings being secured to the upper central portion of frame 13 by any suitable means such as stud bolts 51 and 52. An eccentric 54 is fixedly secured on shaft 34 and is confined within the scotch yoke 55 which is caused to reciprocate upon the oscillation of the eccentric 54.

The scotch yoke 55 has integral therewith, and projecting from opposed sides, arms 56 and 57, said arms being mounted for oscillation in bearings 58 and 59, and these bearings are secured to the upper portion of frame 13 by any suitable means such as stud bolts 60 and 61, respectively. Secured on each end of shafts 56 and 57 is a bracket 62 by any suitable means such as set screws 63. This bracket has arms 64 and 65 projecting therefrom which have suitable bores in the lower side thereof which are adapted to be penetrated by piston shafts 66 and 67.

By referring to Figure 3, the details of each of these members on bracket 62 are more clearly shown. Both arms 64 and 65 of bracket 62 are identical as shown in Figure 3 and the description of one will suffice for both, however, it might be stated that the one shown on the right-hand side of Figure 3 is shown in raised or inoperative position, whereas, the one to the left of shaft 56 is shown in operative position or engaging the piston shaft 66.

Each of the members 64 and 65 has a suitable bore 76 therein in which is mounted a pin 77. This pin 77 has a collar 77a integral therewith which limits the downward movement of spring 78 which is disposed around the pin. A suitable plug 79 is secured in the upper portion of bore 76, said plug 79 being penetrated by the pin 77. It might be stated that this plug also confines the spring 78 within the bore 76 and normally tends to force the pin 77 downwardly against one of the piston shafts. The upper end of pin 77 has threadably secured thereto a member 80 which is locked thereon by any suitable means such as a nut 81.

Mounted in the upper portion of members 64 and 65 is a pin 82. It is seen that this pin 82 is adapted to contact the lower side of the member 80 when it is desired that the particular piston be in inoperative position, as shown in the right-hand portion of Figure 3, whereas, when it is desired that the piston be engaged with the scotch yoke 55, the member 80 is caused to assume a position as shown in the left-hand portion of Figure 3 where the pin 82 penetrates a suitable hole 84 in the member 80. It is therefore seen that when it is desired to disengage a piston shaft from the bracket 62 that by pulling upwardly on the member 80 and giving it a partial rotation that the lower side of member 80 will engage the top of pin 82 and hold the lower portion of pin 77 out of engagement with the groove 85 in the end of each of the pistons 66 and 67.

Pistons 66 and 67 are slidably mounted in suitable sleeves 87 and 88, said sleeves 87 and 88 being confined in housing 89 by any suitable means such as nuts 90 and 91 respectively. The housing 89 is secured to the top of frame 13 by any suitable means such as stud bolts 89a. It is seen that by referring to Figure 5, sleeves 87 and 88 have chambers 92 and 93 surrounding them in which the grease is allowed to flow, and from these chambers the grease is forced through the openings 87a and 88a respectively into the inside of sleeves 87 and 88.

By referring to Figures 4 and 5 it is seen that a V-type housing is provided which has secured to the upper ends thereof suitable grease containers. The grease container 95 is secured to the upper portion of housing 89 by any suitable means such as stud bolts 96, whereas, a bracket 97 is secured to the upper portion of housing 89 by any suitable means such as stud bolts 98. Threadably secured to bracket 97 is the container 99 which is shown in elevation in Figure 4. The container 99 has therein a suitable piston 100 which forms two compartments 101 and 102. The compartment 101 is adapted to contain compressed air which is forced through a suitable valve 103 whereas, the lower compartment 100 contains the grease. It is also noted that a suitable strainer 105 is secured in the lower portion of bracket 97 which prevents undesirable objects from passing through and entering the sleeve 87 through opening 87a. It is further noted that on the container 99 that suitable handles 106 are provided, said handles 106 being secured to the side portion of member 99 and are adapted to be used when it is desired to unscrew member 99 from engagement with the bracket 97 in order to refill the container with grease.

The container 95 has secured in the lower portion thereof a strainer 108 which is similar in all respects to strainer 105 and answers the same purpose. The container 99 is adapted to be used with especially heavy greases in lubricating bearings and the like, whereas, the containers 95 are used in ordinary lubrication where atmospheric pressure is sufficient to force the grease down into compartment 93.

It is seen that by providing this special V-type housing such as 89, that much less space is required to mount a grease gun. It is further seen that the scotch yoke 55 can be mounted to drive either all of the four cylinders as shown in Figure 2 or it can be caused to drive only one cylinder at a time by manipulating the mechanical latches as shown in Figure 3.

Another housing 89 with containers 95 and 99 mounted thereon is secured to the other end of frame 13 and a repetition of the description is not deemed necessary since the parts are identical to the parts already described.

Bearings 58 and 59 have integral therewith and extending upwardly therefrom supports 114 and 115. Mounted on top of these bearings is a box 116 which has therein an ordinary storage battery 117 for driving the apparatus. Secured to the side of box 116 is an ordinary plug 118 in which is adapted to be inserted an ordinary socket from the power line. Connected to plug 118 are wires 119 and 120 which lead into the charging machine 121, said charging machine 121 being secured to the inside of box 116. Another wire 122 leads from the other side of charging machine 121 to a switch 123 and the other side is grounded as at 125.

The switch 123 is normally opened but when it is desired to connect the socket 118 to a source of electrical energy to charge the battery 117, the switch 118 is closed. Another wire 126 leads from the charging box 121 and has one end secured to an ammeter 127. Leading from the other side of the ammeter is a wire 128 which is secured to terminal 129. Leading from terminal 129 is a wire 130 which is connected to one side of a suitable solenoid switch 131, said solenoid switch being normally held open by means of a suitable spring 131a. Leading from the other side of the switch 131 is a wire 132 which is also connected to the motor 27. Another wire 134 leads from said motor and is grounded as at 135. From terminal 129 wire 136 leads to the battery 117 and from battery 117 a bar 137 leads to the ground 138.

Leading from terminal 129 is a wire 139 which has its other end secured as at 140 to bus bar 141, said bus bar 141 being secured to the side of box 116. A suitable insulating block such as hard rubber 142 is disposed between bus bar 141 and box 116. A pair of wires 143 lead from bus bar 141 to suitable switches 144, and to the other side of switches 144 are connected wires 147 said wires 17 having their other ends secured to another bus bar 148. Bus bar 148 is also secured to the side of box 116 and has disposed between the box and the bar another suitable insulating block of material 149. Secured to bus bar 148 as at 150 is a wire 151 which leads to coil 152 disposed within the box 153. From the other side of coil 152 is a wire 154 which leads to a suitable ground 155.

Another pair of wires 157 lead from bus bar 141, said wires 157 having their upper ends connected to a pair of switches 158, and to the other side of these switches are connected wires 160 which are connected to the bus bar 148 disposed on the side of box 116.

It is seen by referring to Figure 9 that by closing either of the switches 144 or 158 the current is allowed to flow from battery 117 to wires 136, 139, bus bar 141, wire 143, switch 144, wire 147, bus bar 148, wire 151 and coil 152 to wire 154 to ground 155. When the current flows through coil 152, this coil is energized which causes the switch 131 to connect the wires 130 and 132 which completes the circuit to the motor and causes the current to flow from the battery 117 through wire 136, wire 130, switch 131, wire 132, motor 27, wire 137, to ground 135. It is evident that by closing either of switches 158 that a similar operation will take place and the motor will be started.

Figure 8:
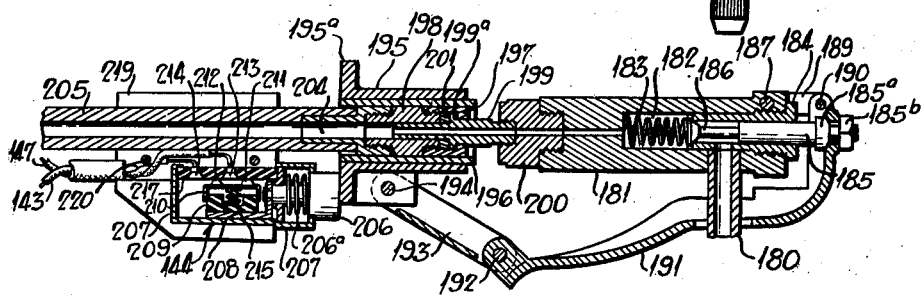
Figure 8 is a longitudinal sectional view taken through the upper portion of Figure 7.

Figures 7 and 8 show a detail of the nozzle used with this apparatus in which the current will be automatically turned on and the motor started upon the opening of the valve to allow the grease to flow from the container. This nozzle comprises a conventional fitting 180 through which the grease is allowed to flow and which fitting is applied to the parts to be lubricated. This fitting is threadably mounted in member 181 which has therein a bore 182, said bore having mounted therein a conventional compression spring 183. The right-hand end of this bore is closed by means of plug 184 which is threadably mounted in the right-hand end thereof and slidably mounted in plug 184 is a pin 185. Secured to the left-hand end of pin 185 is a valve 186 which normally closes the opening in the plug 184.

Pivotally secured as at 187 are links 188 and 189, the other end of said links being pivotally secured to the upper portion of lever 191 as at 190.

It will be seen by referring to Figures 7 and 8 that the right-hand end of pin 185 is pivotally secured to the lever 191, since the pin has integral therewith a shoulder 185a disposed on one side of the lever 191 and a suitable nut 185b disposed on the other side of the lever. The other end of lever 191 is pivoted as at 192 to a link 193. This link 193 is inclined upwardly in Figures 7 and 8 and is pivotally secured as at 194 to a cuff 195. Rotatably secured within cuff 195 is a cylindrical member 196 in which is fixedly mounted member 197.

The left-hand end of member 197 is threadably secured to another member 197 which is also fixedly mounted within cylindrical member 196. It is seen that member 199 has its right-hand end threadably secured in member 200, said member 200 being threadably secured in the end of member 181 whereas the left-hand end of member 199 is rotatably confined within members 197 and 198. A suitable washer 201 is disposed between the shoulders 199a and member 198. The left-hand end of fitting 198 has threadably secured thereto another fitting 204 which, in turn, is secured inside of hose 205.

It is seen that by having member 199 rotatably mounted within members 197 and 198, and also having cylindrical member 196 rotatably mounted within sleeve 195, that the fitting 180 and its associated parts may be rotated about the longitudinal axis of hose 205 and any particular position may be assumed by the end of the nozzle without twisting or distorting the hose.

It is further seen that the cuff 195 has an enlarged ring 195a integral therewith whose left-hand surface (Figs. 7 and 8) normally contacts an electrical button 206 at all times. Button 206 is slidably mounted in housing 207 and this button has secured to the other end thereof an L-shaped member 208. Secured to L-shaped member 208 is a block of hard rubber or insulating material 209, said block 209 having mounted on the upper side thereof a member 210 which has projections 211 and 212 integral therewith which are adapted to contact terminals 213 and 214 respectively, when the switch is closed. A spring 215 is mounted in block 209 which normally pushes member 210 upwardly at all times against the insulating block 217 which contains the terminals 213 and 214. The casing 207 is disposed between the members 218 and 219, said members 218 and 219 being secured around the hose 205 by any suitable means such as rivets 220. It is evident that when handle 191 is pushed towards the member 181 that the cuff 195 will be forced to the left which will cause the terminals 211 and 212 to contact the terminals 213 and 214 which will complete the circuit and cause the motor to start pumping grease.

In order that button 206 will contact portion 195a at all times a spring 206a is confined around the left-hand portion of button 206 having one end abutting casing 207 and the other end abutting the large portion of the button 206.

Not only is this nozzle provided with a swiveled joint so that the nozzle 180 may be turned in any direction, but it also provides means whereby a certain amount of back pressure may be built up in the line and by pressing downwardly a slight amount on the handle 191 the valve 186 will be opened but the connection will not be made between the terminals 211, 212, 213 and 214 to cause the motor to start. This will allow a number of points to be greased with the back pressure without starting the motor each time a point is greased. The distance between terminals 213 and 214 makes it possible to open the valve 186 without causing contact points 211 and 212 to contact them.

In the drawings and specification there has been set forth a preferred embodiment of the invention, although specific terms are employed, they are used in a generic and descriptive sense only, and not for purposes of limitation, the scope of the invention being set forth in the appended claims.

I claim:

1. Lubrication apparatus comprising a portable framework, an electric motor mounted on the framework, a plurality of grease guns mounted on the framework, each grease gun having a piston for expelling the grease under pressure, a reciprocating member driven by the motor for driving the pistons of said pumps and disposed between the grease guns and normally disconnected from the pistons, and mechanical latching means on each end of the reciprocating member for selectively engaging the pistons when pre-set upon reciprocation of the reciprocating member.

2. In a lubrication apparatus, in combination, a portable framework, a plurality of grease guns mounted on the framework, each of the grease guns having a piston adapted to be reciprocated to expel grease from the grease gun, a reciprocating member, an electric motor for driving the reciprocating member, said reciprocating member having a plurality of latches thereon for engaging the pistons to connect the pistons to the reciprocating member, means normally pressing the latches to engaging position with relation to the reciprocating member, and means for latching said latches out of engaging position with relation to the reciprocating member.

3. Lubricating apparatus comprising a framework, a plurality of grease guns mounted on the framework, common driving means for all of the grease guns and a manually settable latch between the driving means and the grease guns for connecting a selected grease gun with the driving means upon movement of the driving means.

4. Lubrication apparatus comprising a framework, a housing having a pair of compartments therein mounted on the framework, a piston mounted for reciprocation in each compartment, driving means for said pistons, and means for securing a pair of lubricant containers to the upper portion of said housing in divergent relation to each other, each of said containers having communication with one of said compartments.

5. Lubrication apparatus comprising a framework, an electric motor mounted on the framework, a member mounted for reciprocatory movement in the framework, means driven by the motor for imparting reciprocatory movement to said reciprocatory member, a lubricant dispensing apparatus disposed on one end of the framework and having a piston adapted to be driven by the reciprocatory member, said reciprocatory member having mounted on one end thereof a latch member normally engaging the associated piston upon reciprocation of the reciprocatory member, and said latch member having means for manually setting the same in inoperative position so that it cannot engage the piston.

6. Lubrication apparatus comprising a wheeled framework, a grease gun disposed on the framework and having a piston, an electric motor for driving the piston, a manually releasable connection between the electric motor and the piston of the grease gun, the releasable connection comprising a cavity in one end of the piston, a reciprocatory member driven by the motor, a plunger mounted on the reciprocatory member, a spring for normally pressing said plunger to a position where one of its ends will engage said cavity and lock the reciprocatory member to said piston and means for locking said plunger in a position where it will not engage said cavity upon reciprocation of said reciprocatory member.

7. Lubrication apparatus comprising a pair of lubricant containers disposed at divergent angles with relation to each other and having a common base, said base having a partition therein forming two compartments, a lubricant pump disposed in each compartment, driving means for the pumps, and manually operated latches for selectively connecting the pumps to the driving means.

8. Lubrication apparatus comprising a pair of lubricant containers disposed at divergent angles with relation to each other and having a common base, said base having two separated compartments therein, a lubricant pump disposed in each compartment, common driving means for the pumps, and means for selectively connecting the driving means to the pumps.

WILLIAM Y. BROWN.